United States Patent Office 2,776,262
Patented Jan. 1, 1957

2,776,262
KNOCK-SUPPRESSING COMPOSITION

George H. Denison, Jr., San Rafael, and Maurice R. Barusch, Richmond, Calif., assignors to California Research Corporation, San Francisco, Calif., a corporation of Delaware No Drawing. Application December 29, 1949, Serial No. 135,822

1 Claim. (Cl. 252—386)

The present invention relates to a spark-ignition engine composition; particularly, to a knock-suppressing composition which is injected into a spark-ignition engine.

As the design of spark-ignition engines in mass production has advanced, engines have been developed in which the compression ratio has been increased from a low-compression ratio of 4 to 1 to a high-compression ratio as high as approximately 7.5 to 1. It is known, as compression ratio increases, fuels of higher octane rating are required.

Knocking occurs more readily in high-compression engines than in low-compression engines and is most prominently noticed when the engine is subjected to full throttle or the engine is operating under a heavy load. For example, when airplanes are taking off, a terrific upsurge in power output is required. On take-off, the airplane engines are functioning at high-load capacities and require high-octane fuels in order to function properly without knocking.

Several methods of inhibiting this knocking in spark-ignition engines have been evolved during the past years. On the one hand, the octane values of fuels have been increased. This has been done by adding octane number improvers such as lead tetra-ethyl or high-octane blending stocks directly to the spark-ignition-engine hydrocarbon fuel. On the other hand, knock inhibition has been accomplished by the use of water-alcohol mixtures which are injected into the spark-ignition engine as supplementary fuels. At one time, plain water was used as an anti-knock agent by injecting it into the engine along with the vaporized fuel.

The injection system of introducing the anti-knock agents into the fuel-intake system of the spark-ignition engine is advantageous as a means of employing gasoline insoluble anti-knock agents rather than trying to disperse them in the gasoline-base fuel itself, as it permits the use of fuel soluble or insoluble in the anti-knock agents. Furthermore, the injection of anti-knock agents into the fuel-intake system as a separate stream from that of the base fuel itself tends to reduce engine deposits on the pistons and engine knocking. Engine knocking, besides being obnoxious to the ear, may result in engine overheating, engine power loss, and a tendency to produce pre-ignition which may lead to engine failure.

It is a primary object of this invention to inhibit knocking in spark-ignition engines.

It is an object of this invention to provide a composition which will inhibit knocking in a spark-ignition engine.

It is a further object of this invention to produce an anti-knock composition suitable for injection into a spark-ignition engine.

It is another object of this invention to inhibit knock in a spark-ignition engine using a fuel of lower octane number than that normally required for completely knock-free operation.

It is a still further object of this invention to increase the over-all economy of a spark-ignition engine by injecting a knock-suppressing composition into a fuel-air mixture in a spark-ignition engine.

These and other objects will be readily apparent from the following detailed disclosure of the present invention.

According to this invention, it has been discovered that a knock-suppressing composition containing water-soluble thallium compounds in water or in a water-alcohol mixture will suppress engine knocking in internal-combustion engines.

As used herein and in the appended claims the term "knock-suppression composition" is a composition which is used in addition to a primary fuel, that is, a composition which is additional to the gasoline type of spark-ignition fuel. The knock-suppression composition may be injected into the engine in the primary fuel induction system; for example, in the intake manifold where the gasoline already has been mixed with air.

A further advantage obtained by injecting an anti-knock composition in a stream separate from the primary fuel-air mixture lies in the fact that the anti-knock mixture may be used just at those times when it is required. The present high-compression engines, when operated at normal loads and speeds, do not always require high-octane gasoline. When a spark-ignition engine is being operated under moderate load conditions, for example, when a car is moving along a level road at a constant speed, there is little tendency toward knocking; thus, there is no requirement for an anti-knock agent to be used in the fuel stream. For example, a present-day automobile may be driven on relatively level roadways at constant speeds of 30, 40, 50 or 60 miles per hour and use a low-octane gasoline (such as 40 octane) without knocking occurring. However, when a spark-ignition engine is accelerated swiftly or there is a sudden load thrust upon the engine because of an incline, then there is a necessity for the use of an anti-knock agent to suppress the "knocking" resulting from the full-throttle operation of the engine.

In order to avoid the knocking accompanying the use of too low an octane fuel under such full-throttle conditions as noted above, water-alcohol-additive compositions may be injected into the intake system of the engine during the time when the additional power requirements are necessary to be met.

The power requirements of a spark-ignition engine resulting in knocking exist usually for relatively short periods of time in the total operation of the engine. This characteristic makes it extremely beneficial to use a dual system whereby a relatively low-octane gasoline is used during constant load conditions while a second composition containing an anti-knock agent may be injected at those moments when the higher power output is necessary. Thus, one system supplies a primary motor fuel of relatively low octane number which meets the anti-knock requirements for normal "cruising" operations, and a second system supplies a knock-suppression composition to bolster the primary fuel when greater anti-knock requirements are suddenly needed. Such a composition would eliminate the continuous use of high-octane number fuel and at the same time completely satisfy the anti-knock requirements of a spark-ignition engine. For example, it is possible to obtain knock-free operation of a spark-ignition engine by using 40 octane number fuel for a majority of the time in an engine having a normal road requirement of 77 octane numbers.

A knock-suppression composition of this invention comprises water, alcohol, and active anti-knock agents with the alcohol at least in part acting as a solvent for the anti-knock agents.

The alcohol of the composition of this invention may be selected from alcohols containing from 1 to 4 carbon atoms. It is generally preferred that methyl alcohol be used in the composition of our invention. Examples of the alcohols which may be used include: methyl alcohol, ethyl alcohol, propyl alcohol, isopropyl alcohol, n-butyl alcohol, isobutyl alcohol, secondary butyl alcohol, and tertiary butyl alcohol.

The alcohols may form up to about 50 percent of the composition of this invention. However, it is generally preferred to use water-alcohol mixtures containing 10 to 20 percent by volume of alcohol and 80 to 90 percent by volume of water, the amount of alcohol present in the composition being at least partially dependent upon the temperature condition under which it is used. That is, the alcohol, in part, serves as an anti-freeze agent. It is possible, therefore, to have the fuel composition of this invention composed of water and water-soluble thallium compounds when the climatic conditions do not require the presence of an anti-freeze agent.

The particular anti-knock agents of this invention are water-soluble thallium compounds. As noted above, alcohol, water and mixtures thereof have heretofore served as anti-knock agents in spark-ignition engine fuel compositions. However, the alcohol, the water, and the alcohol-water blends are remarkably improved by the addition of water-soluble thallium compounds. Examples of these thallium compounds include both organic and inorganic compounds.

Generally the organic thallium compounds should contain oxygen, carbon, hydrogen, and thallium. Organic compounds containing additional elements do not appear to be particularly desirable and may act as pro-knock additives. The organic thallium compounds should be soluble in the water or water-alcohol mixture in order to be desirable as a component of the composition of this invention. The more soluble thallium compounds are generally preferred. Examples of organic compounds of thallium found to be desirable are carboxylates such as thallium acetate and thallium formate, etc.

The inorganic thallium compounds have been found to be particularly desirable as a component of the composition of this invention. Like the organic compounds, it is generally preferred that these compounds contain oxygen, hydrogen, carbon, and thallium. Examples of inorganic compounds include thallium hydroxide and thallium carbonate.

Monovalent thallium compounds are generally preferred as they are generally more stable and it has been found preferable to use the more stable thallium compounds. Instead of using a single thallium compound, mixtures of two or more thallium compounds may be used. The preferred thallium compounds are thallium formate, thallium hydroxide and thallium acetate. In addition, other spark-ignition engine additives, such as tetra-ethyl lead, iron carbonyl, etc., may be included in the composition of this invention.

As noted hereinabove, the water-alcohol mixtures may be varied to contain the above-noted proportions of water and alcohol in the mixture. The thallium compounds may be present in amounts of 0.1 weight percent based on the final composition of the fuel to an amount limited by solubility of the thallium compounds in the water-alcohol mixture, with about .2 to 10 weight percent being preferred.

The water, alcohol, and thallium compounds may be blended simply by mixing the components of the mixture. Heating or agitating may be necessary in some instances, in order to aid the blending.

In addition to the water, alcohol, and thallium compounds of the injection composition of this invention, minor amounts of various inhibitors may also be added. These inhibitors include gum inhibitors, rust inhibitors, and corrosion inhibitors such as sodium alkyl sulfonates, etc.

The primary fuel which is improved by the injection of the knock-suppression composition of this invention may be any hydrocarbon boiling in the gasoline boiling range; that is, having an ASTM (D–86) distillation with an initial boiling point of about 100° F. and a final boiling point of about 400° F.

The primary fuels may be leaded or unleaded. It is preferred to use an unleaded primary fuel from the standpoint of using a fuel which does not have the deleterious effects of lead and also which generally is less expensive than a leaded fuel. On the other hand, leaded fuels are preferred where there is an extraordinarily high percentage of time when the engine is used under conditions requiring greater amounts of power output which could not be attained with unleaded fuels.

As stated hereinabove, the composition of this invention normally is not continuously injected into the spark ignition engine during the whole time when the engine is in operation. Preferably, it is injected only intermittently, as required. This does not mean that the composition is injected with total disregard to the amount of base fuel which is being used in the engine. During the periods of secondary injection, the knock-suppression composition may be injected in such amounts as to constitute from two percent to 50 percent of the total mixture (exclusive of air) flowing to the combustion chamber; two percent to 20 percent being preferred. That is, the ratio of primary fuel to this knock-suppression composition injected normally would be from 49:1 to 1:1, with 49:1 to 5:1 being preferred. For example, an injection composition of this invention consisting of a mixture of 20 percent alcohol, 75 percent water and 5 percent of a water-soluble thallium compound, may be injected into the intake manifold of a spark-ignition engine at the rate of one part of the knock-suppression composition to 10 parts of primary fuel to suppress the detonation and increase the available power output of a spark-ignition engine during rapid full-throttle acceleration.

The method of this invention reduces the need for large quantities of leaded gasolines and permits the use of less highly refined spark-ignition engine fuels having lower octane numbers than normally required for satisfactory operation of high compression engines.

Fuel compositions of this invention were tested and rated according to the F–4 method, described in a report by the Coordinating Research Council dated April 20, 1943, and entitled "CFR Supercharge Method of Test for Knock Characteristics of Aviation Fuels." This method rates a fuel under conditions of supercharging and rich fuel-air mixtures and it correlates well with full-scale ratings of fuels, as in aircraft take-off and climbing. The engine employed is a single cylinder, liquid-cooled, gasoline spark-ignition engine; the engine is equipped for supercharge; the compression ratio is 7:1, the engine is operated at 1800 R. P. M., 375° F. jacket temperature, 225° F. air temperature and 45° spark advance BTC; and the knock-suppression composition consisting of alcohol, water and additive is injected into the intake manifold so that it is combined in the intake manifold with the primary fuel-air mixture.

Ratings by the F–4 method are given in terms of octane numbers up to 100 octaine, and above 100 octane they are given in performance numbers. The performance number is used to designate the relative knock-limited power output of fuels having octane numbers above 100 when tested according to the F–4 procedure. Iso-octane having an octane number of 100 has a performance number of 100. A fuel having a performance number of 130, for example, has a knock-limited power output 1.3 times that of the fuel having a performance number of 100.

The examples in the following tables will serve to further illustrate the practice and advantages of this invention. In the examples in each of the tables, water-alcohol mixtures were injected into the engine at a rate of one volume water-alcohol mixture per 10 volumes of petroleum fuel. The water and alcohol (methyl) were present in a weight ratio of 4:1 and the water-soluble thallium compounds were added in the indicated percentages by weight. The test engine was operated at a fuel-air ratio of 1:10.

Inspection of the primary fuel for the examples in Table I follows:

Composition:

| | |
|---|---|
| Cumene _____volume percent__ | 11.0 |
| Alkylate _____do____ | 27.5 |
| C₁₃ (distillate cut containing paraffins and naphthenes) _____do____ | 61.5 |
| | 100.0 |

| | |
|---|---|
| Aviation TEL_____ml./gal____ | 4 |
| Gravity (API at 60° F.)_____ | 59.7 |
| Performance number_____ | 131 |

*Table I*

| Example | Knock-Suppression Composition | Performance No. |
|---|---|---|
| 1 | None | 131 |
| 2 | 80% water and 20% methyl alcohol | 136 |
| 3 | 76% water, 19% methyl alcohol, and 5% thallous acetate | 157 |
| 4 | 77.6% water, 19.4% methyl alcohol, and 3% thallous carbonate | 152 |
| 5 | 72% water, 18% methyl alcohol, and 10% thallous formate | 186 |
| 6 | 90% water and 10% thallous formate | 180 |
| 7 | 76% water, 19% methyl alcohol, and 5% thallous hydroxide | 165 |

From the foregoing Table I, it can be seen that the water-soluble thallium compounds give an increase in performance numbers. Of the thallium compounds given in this table, thallium formate appears to be the most effective.

A fuel having the following inspection was tested with thallium formate:

| | |
|---|---|
| Source _____ | (1) |

¹ Blended stock containing straight-run, cracked, reformed and alkylate distillates derived from a California crude.

Distillation (ASTM-D86):

| | |
|---|---|
| 10 percent_____° F__ | 130 |
| 50 percent_____° F__ | 225 |
| 90 percent_____° F__ | 356 |
| Octane number_____ | 81 |
| TEL _____cc./gal__ | 3 |
| Performance number_____ | 81 |

Table II, which follows, gives the results of tests conducted under conditions similar to those given in Table I.

*Table II*

| Example | Knock-Suppression Composition | Performance No. |
|---|---|---|
| 1 | None | 81 |
| 2 | 80% water and 20% methyl alcohol | 85 |
| 3 | 72% water, 18% methyl alcohol, and 10% thallous formate | 107 |
| 4 | 90% water and 10% thallous formate | 102 |

This table illustrates that fuels having performance numbers in the range of automobile gasoline can be augmented by a water injection composition.

While the invention has been described herein with reference to certain specific embodiments and specific examples thereon, it is not intended that the invention shall be limited to such embodiments and examples except as hereinafter defined in the appended claim.

We claim:

A knock-suppressing composition for spark-ignition engines comprising an aqueous monohydric alcohol solution wherein said alcohol has 1 to 4 carbon atoms per molecule and is present in amounts of about 10 to about 50 volume percent of said solution, and from about 0.1 to 10% by weight of thallous formate.

References Cited in the file of this patent

UNITED STATES PATENTS

| | | |
|---|---|---|
| 1,771,169 | Egerton _____ | July 22, 1930 |
| 2,365,009 | Robertson _____ | Dec. 12, 1944 |
| 2,460,700 | Lyons et al. _____ | Feb. 1, 1949 |
| 2,562,885 | Barusch et al. _____ | Aug. 7, 1951 |

OTHER REFERENCES

Chemical Abstracts, vol. 36, page 4753 (1942).

Handbook of Chemistry and Physics, 28th edit. (1944), pages 472–474, Chem. Rubber Pub. Co.